United States Patent

Oechsle et al.

[11] Patent Number: 6,077,428
[45] Date of Patent: *Jun. 20, 2000

[54] DISK FILTER

[75] Inventors: Dietmar Oechsle, Bettringen; Boris Gehring, Tubingen; Ludgar Gottkehaskamp, Goggingen; Wolfgang Baur, Waldstetten; Josef Ziller, Waldstetten; Wolfgang Diemer, Waldstetten; Dieter Kress, Waldstetten, all of Germany

[73] Assignee: Schenk Filterbau Gesellschaft Mit Beschraenkter Haftung, Waldstetten, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/913,813

[22] PCT Filed: Jan. 18, 1997

[86] PCT No.: PCT/EP97/00232

§ 371 Date: Sep. 24, 1997

§ 102(e) Date: Sep. 24, 1997

[87] PCT Pub. No.: WO97/26975

PCT Pub. Date: Jul. 31, 1997

[30] Foreign Application Priority Data

Jan. 24, 1996 [DE] Germany .............................. 196 02 349

[51] Int. Cl.[7] ...................................................... B01D 33/15
[52] U.S. Cl. ........................... 210/330; 210/344; 210/345; 210/456
[58] Field of Search ........................ 210/323.1, 330–332, 210/334, 340, 344–347, 456, 486, 487, 492; 55/158, 484

[56] References Cited

U.S. PATENT DOCUMENTS 4,767,534  8/1988  Ziller ........................................ 210/331

FOREIGN PATENT DOCUMENTS 3529706  3/1987  Germany .

*Primary Examiner*—Matthew O. Savage
*Attorney, Agent, or Firm*—Foley & Lardner

[57] ABSTRACT

The invention relates to a filter for the deposition filtration of liquids such as juice, wine, beer or the like. A filter packet (28) of plate-type filter elements (25), stacked one on top of the other, is disposed in a container (3), each filter element (25) having a hub (26) that is oriented in its position by a shaft (12) penetrating the filter packet (28). In the hub (26), there is provided an axial inlet line (36) for the material (18) to be filtered, which inlet line feeds by a plurality of inflow channels (46) which are situated to be uniformly distributed in the peripheral direction of each hub (26) and which lead substantially radially outwards. The inflow channels (46) open into an annular distributor space (47), from which the material to be filtered flows out. The material to filtered flows out via an outlet gap (45) situated above the inflow channels (46), radially into the space (29) between adjacent filter elements (25). To guarantee a uniform, homogeneous and stable filter cake build-up, provision is made for sectioning the outlet gap (45) by separating walls (48) into a plurality of outlet paths (49) which are situated to be uniformly distributed over the periphery of the annular distributor space (47).

17 Claims, 5 Drawing Sheets ly large-sized disk
DISK FILTER

BACKGROUND OF THE INVENTION

1. Field of the Invention

The invention relates to a filter for the deposition filtration of suspensions such as juice, wine, beer, chemical liquids or the like having plate-like filter elements stacked one on the other to form a filter pack in a container, each filter element having a hub which is aligned in its position by a shaft passing through the filter pack having a pipe for the unfiltrate passing axially through the hub and a plurality of feed channels uniformly distributed in the circumferential direction of each hub and leading substantially radially outward, which are fed by the inlet line and lead into a distribution ring chamber out of which the unfiltrate flows substantially perpendicular to the hub periphery through an outlet gap lying above the feed channels and radially into the space between adjacent filter elements.

2. Description of the Related Art

Such a disk filter is known from U.S. Pat. No. 4,767,534. Via inlet lines formed in the hub, the material to be filtered is fed to inflow channels, which branch off radially and open into an annular distributor space formed, in each instance, below the filter tray of a filter element. From this annular distributor space, flow occurs directly through the axially disposed filter element, thereby achieving a uniform flow distribution to build up a homogeneous filter cake. The filtrate is drawn through filtrate draw-off channels, which lead into the center of the hub. These known disk filters guarantee good filtration results with a high degree of utilization of the auxiliary filtration substances. In this case, to build up a uniform and stable filter cake, the overall size, type of construction, and the various filtering aids must be adapted.

SUMMARY OF THE INVENTION

An object of the invention is to further develop a known disk filter of the generic type in such a way that, in the case of filter arrangements of differing overall size and type of construction and the use of the most widely varying auxiliary filtration substances, a homogeneous and stable filter cake build-up is guaranteed without requiring extensive adaptation.

According to the invention, this object is achieved via a plurality of plate-like filter elements stacked one on the other to form a filter pack in a container, each filter element having a hub which is aligned its position by a shaft passing through the filter pack, an inlet line for a material to be filtered passing axially through the hub; and a plurality of inflow channels substantially uniformly distributed in a peripheral direction to each hub and leading substantially radially outward from each hub, the plurality of inflow channels being fed by the inlet line and leading into an annular distribution chamber out of which the material to be filtered flows substantially perpendicular to the hub periphery through an outlet gap situated above the inflow channels and radially into a space between adjacent filter elements, wherein, around a periphery of the annular distribution chamber, the outlet gap is divided by a plurality of dividing walls into a plurality of outlet paths aligned substantially parallel to the filter element such that a concentrated radial liquid jet directed approximately parallel to the filter element is formed, by which the material to be filtered is brought into the space between two filter elements.

It has become evident that sectioning the outlet gap, by separating walls, into a plurality of outlet paths promotes a disturbance-free build-up of the filter cake. If, in addition, the separating walls that bound the outlet paths are disposed in such a way that—as seen in plan view onto the hub—each lies between the openings of adjacent inflow channels, then a homogenous, stable filter cake build-up can be achieved, even in the case of disk filters having very large diameters. Thus, the design according to the invention allows the well-established principles of small and medium-sized disk filters to be implemented in large and very large-sized disk filters with low cost and high quality.

Preferably, opposite the opening of the inflow channel, there is a wall that forms a wall-portion of a stilling chamber of the annular distributor space. The material to be filtered, which is branched off from the inlet line, flows at high speed into the chamber; in this case, the high kinetic energy is converted upon impact on the wall. Thus, the flow velocity at the outlet paths can be adapted as is necessary to form an appropriate flow distribution to build-up a good filter cake.

The chambers of the hub of a filter element which still flow are preferably combined into a common annular chamber, which the annular distributor space axially adjoins. In this case, the individual chamber or the annular chamber lies at least partially, preferably completely, in the hub itself.

The inflow channel is branched from a housing pocket formed in the wall of the inlet line to prevent an undesirable injector effect with a possible flow reversal in the inflow channel, which may result due to the prevailing flow conditions in the inlet line.

Further features of the invention are evident from the claims and the description and drawings, which show illustrative embodiments of the invention and are described in detail in the text which follows.

BRIEF DESCRIPTION OF THE DRAWINGS

The preferred embodiments will be described with reference to the following drawings in which like numerals represent like parts.

DETAILED DESCRIPTION OF THE PREFERRED EMBODIMENTS

Figure 1:
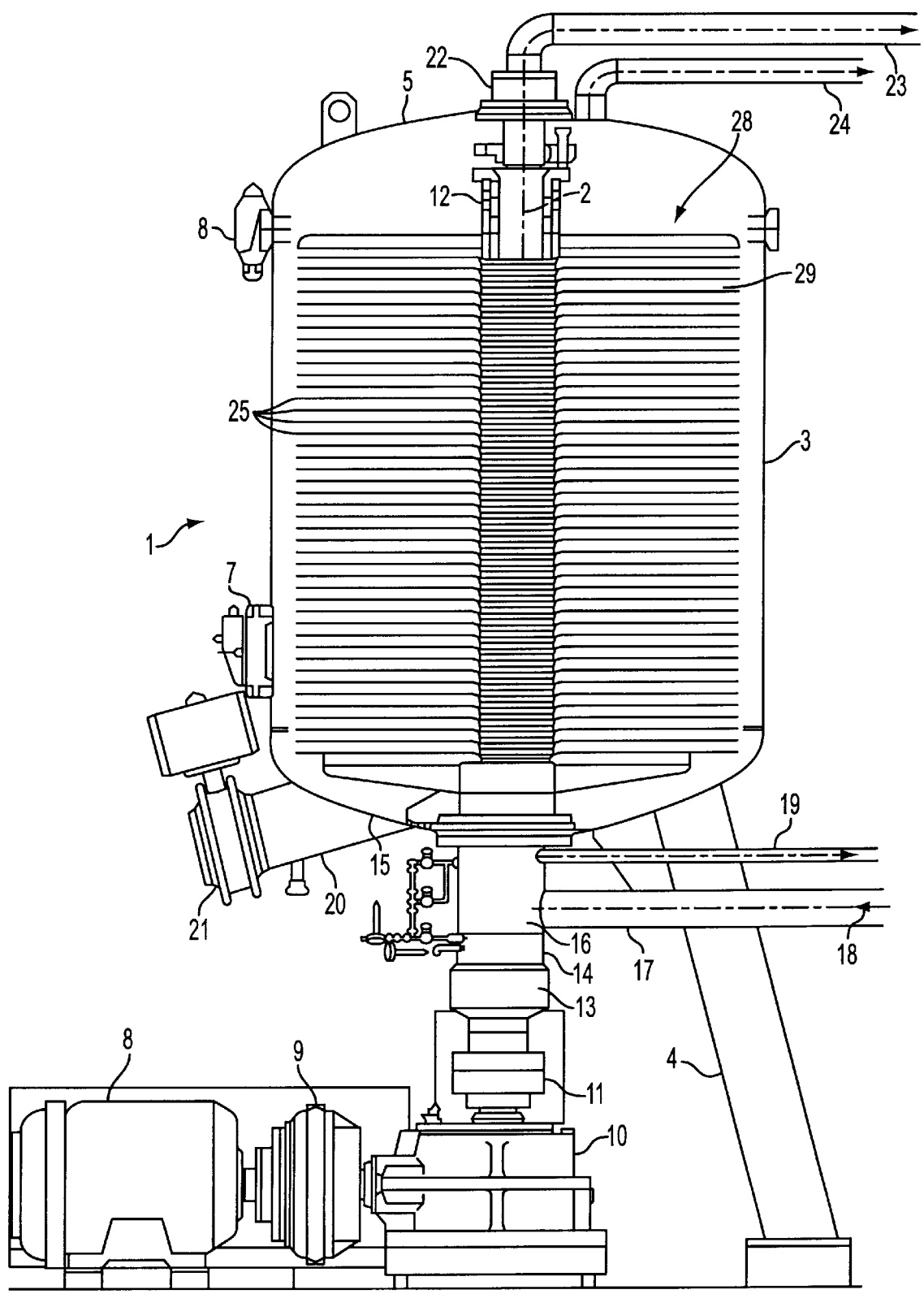
FIG. 1 shows, in diagrammatic representation, in partial cross-section, a disk filter designed as a centrifugal filter.

The disk filter 1, shown in FIG. 1, is intended for filtering liquids, such as juice, wine, beer, chemical liquids and the like, and is designed as a centrifugal purifying filter. The latter comprises a container 3 having a vertical upright axis 2. The container 3 stands on legs 4 of a stand and has a releasable cover 5 which is fixed by means of pressure seals 6 in pressure-tight fashion on the container. An inspection glass 7 is disposed at one of the sides of the container 3.

In the illustrative embodiment, below the container there is an electrical drive motor 8 with a fluid coupling 9 that drives, via an angle gear 10 and a shaft coupling 11, a shaft 12 which penetrates the container 3 coaxially with the upright axis 2. The shaft 12 can be designed as a hollow shaft. The shaft 12 is held in a bearing 13 by the shaft coupling 11. An inflow connection 16, which is centrally disposed at the floor 15 of the container 3, is connected via a sealed housing 14 and to which the liquid to be filtered, the material 18 to be filtered, is fed in the direction of the arrow through an inflow pipe 17.

A draw-off or pipe 19, through which the residual filtrate is drawn off, is further provided under the floor 15 of the container 3. Moreover, an obliquely downwardly directed pipe connection 20 having a shut-off valve 21, for discharging filtrate residues and filtering aids, is disposed in the floor 15 of the container 3.

A central outlet connection 22, through which the liquid 23, which has been purified by filtration, is drawn-off, is connected to the cover 5 of the container 3. The outlet connection 22 is, at the same time, designed as a bearing for the shaft 12. A vent 24 is also disposed on the cover 5.

Figure 2:
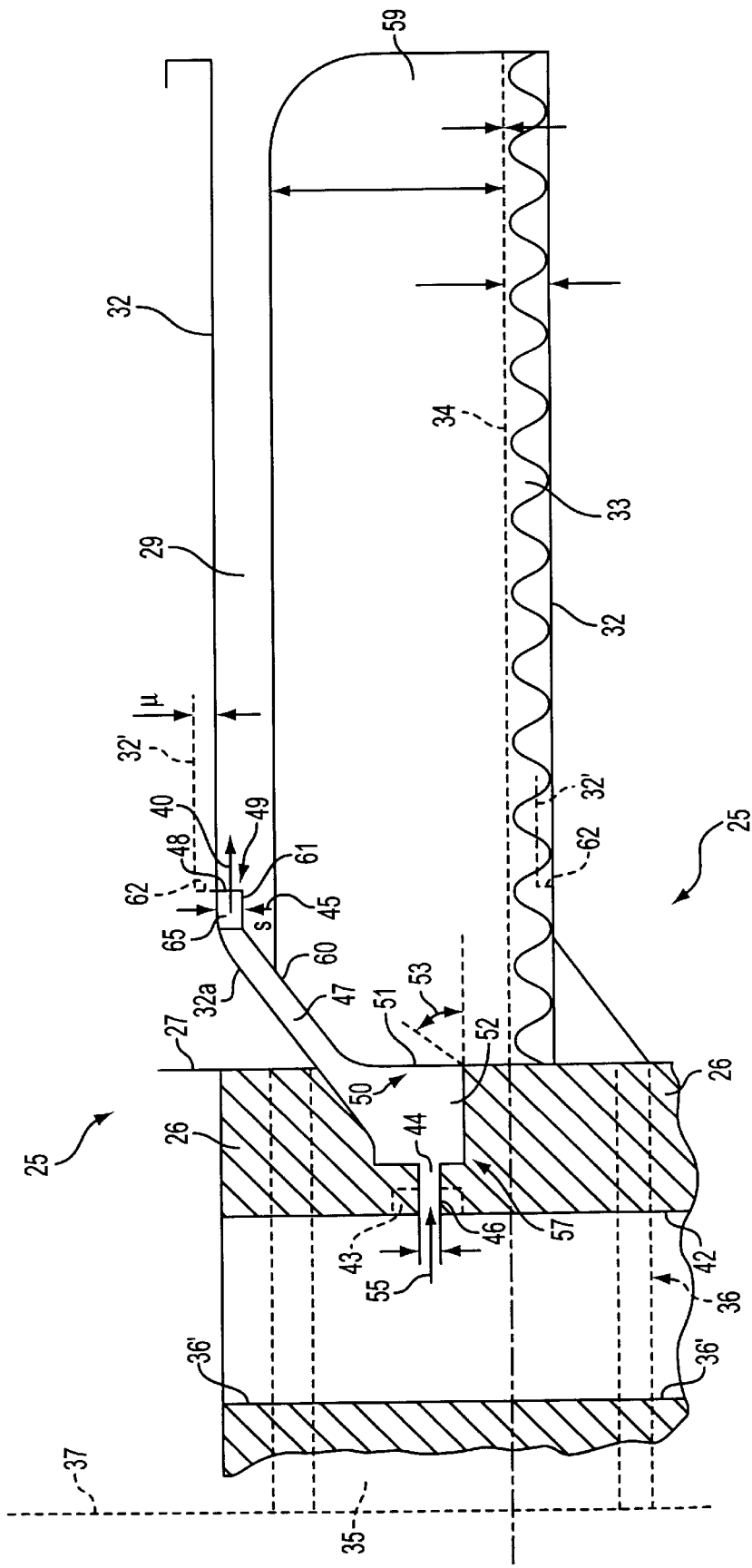
FIG. 2 shows a partial cross-section through the filter packet of the disk filter.
Figure 3:
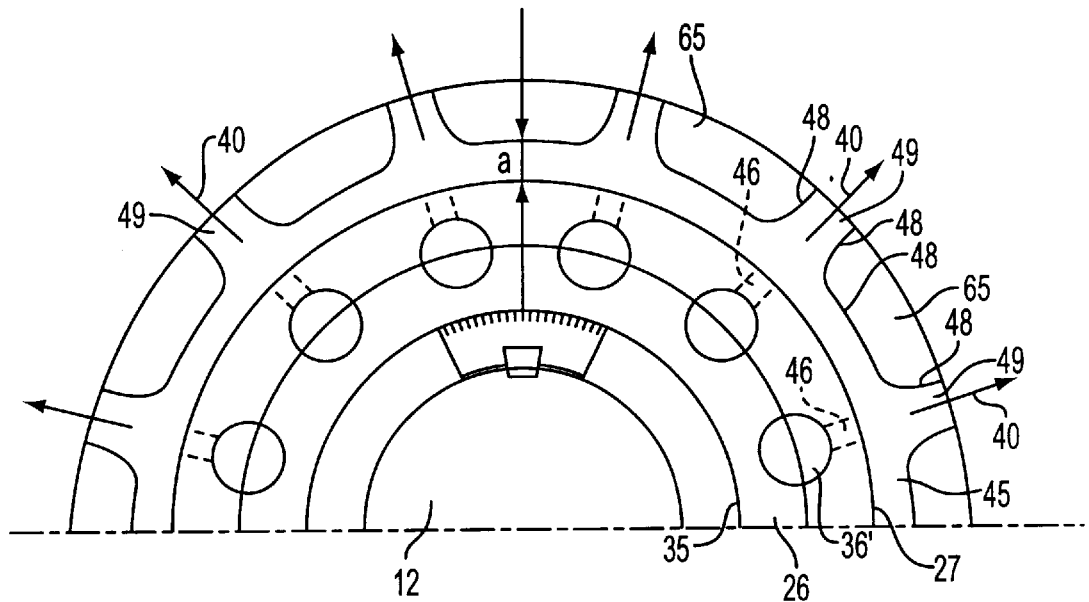
FIG. 3 shows a partial plan view onto a filter element.

A filter packet 28 of plate-type filter elements 25, which are stacked on another, is disposed in the container 3. As seen in FIG. 2, the filter elements 25 essentially consist of a filter tray 32, having a drain 33, which is covered by a filter gauze 34 of fine steel. The filter tray 32 is retained by a hub 26. The shaft 12 passes through a central opening 35 of the hub 26. As shown in FIG. 3, the hub 26 consists of an annular disk in which continuous axial bores 36' are disposed. A plurality of bores 36' are uniformly distributed over the periphery of the hub 26. The plurality of bores form an inlet line 36 for the material to be filtered when the filter elements 25 are threaded on the shaft 12. Thus, a plurality of inlet lines 36 are formed in the hub 26 and are uniformly distributed over the periphery of the shaft 12. Twelve inlet lines 36 are provided in the shown preferred embodiment shown.

Inflow channels 46, which open into a chamber 52 that stills the flow, branch off from each inlet line 36 and are oriented radially about the central axis 37 of the hub 26. The wall portion 51 bounding this stilling chamber forms an imperforate annular wall 50 lying opposite the opening 44 of the inflow channel 46 in the direction of flow 55. As shown in broken lines, this wall 50 can be situated at an angle 53 of 10° to 170°, preferably 90°, to the direction of the flow 55 passing out from the inflow channel 46. In this case, the wall 50 extends at least over the entire flow cross-section of the opening 44 of the inflow channel 46. Preferably, the wall 50 is designed to be larger than the flow cross-section of the opening 44.

As seen in FIG. 2, the stilling chamber 52 lies, at least partially, in the hub 26. In the preferred embodiment of FIG. 2, the chamber 52 lies completely in the hub 26. Moreover, it has proven to be beneficial to connect together all of the chambers 52, which are provided over the periphery of the hub 26, in the peripheral direction so that a common annular chamber 57 is formed into which all inflow channels 46 of a hub 26 open.

An annular distributor space 47, which is designed essentially as an annular gap, axially adjoins the common annular chamber 57 at an end face. The annular distributor space 47 is bounded, at one end, by the internal margin 32a of the filter tray 32 and, on the other end, by an imperforate annular sleeve 60 that extends approximately parallel to this internal margin 32a. The foot portion of the sleeve 60 lies parallel to the hub envelope 27 and forms the wall 50 against which the flow occurs and which closes the annular chamber 57 of the hub 26. The annular chamber 57 is formed from an external peripheral groove. The head region of the sleeve 60 merges into an imperforate annular collar 61, which extends substantially parallel to the filter tray 32, underneath the sleeve 60. The collar 61 forms, together with the filter tray 32, an outlet gap 45 that extends over 360°. The outlet gap 45 has a height s that is, preferably, greater than the diameter of the inflow channel 46. The annular distributor space 47 extends radially and upwardly from the stilling space 52 to the filter plate 32 of the same filter element 25. As shown in FIG. 2, the wall 50, sleeve 60, and collar 61 together form an imperforate annular member.

As seen in FIGS. 2 and 3, radial channels outlet gap 45 is sectioned by separating walls 48 into a plurality of outlet paths 49 uniformly distributed over the periphery of the annular distributor space 47. As seen in the plan view of FIG. 3, each separating wall 48 lies between the openings 44 of adjacent inflow channels 46. Thus, the material to be filtered passes out substantially perpendicular to the hub envelope 27 via the outlet gap 45 in the direction of the arrow 40. The material to be filtered passes in the form of a concentrated liquid jet, which distributes the material to be filtered uniformly over the entire diameter of the filter element. By reason of the pressure gradient, the material to be filtered, which is introduced via the outlet paths 49 into the space 29, flows in a largely uniform flow distribution in the direction of the filter gauze 34 of the filter element 25 situated there below. In this case, the auxiliary filtration substances are deposited on the filter gauze 34 with the build-up of the filter cake 59.

As FIG. 3 shows, the separating walls 48 may be oriented in the radial direction to form the desired outlet path 49. It may be desirable to orient the separating walls 48 in the peripheral direction of the hub 26 and provide the separating walls 48 with a radial spacing a from the hub envelope 27. In the embodiment of FIG. 3, the separating wall 48 is formed by an indentation 65 in the collar 61 of the sleeve 60 bounding the annular distributor space 47. In this case, the separating wall 48 is oriented, in partial regions, radially to the hub 27. In this case, the indentation 65 is provided in such a way that the edges are rounded so that the outlet path 49 broadens in the manner of a funnel in the direction toward the annular distributor space 47.

Preferably, the outlet path 49 has a greater flow cross-section than the opening 44 of the inflow channel 46 to the annular distributor space 47.

Figure 4:
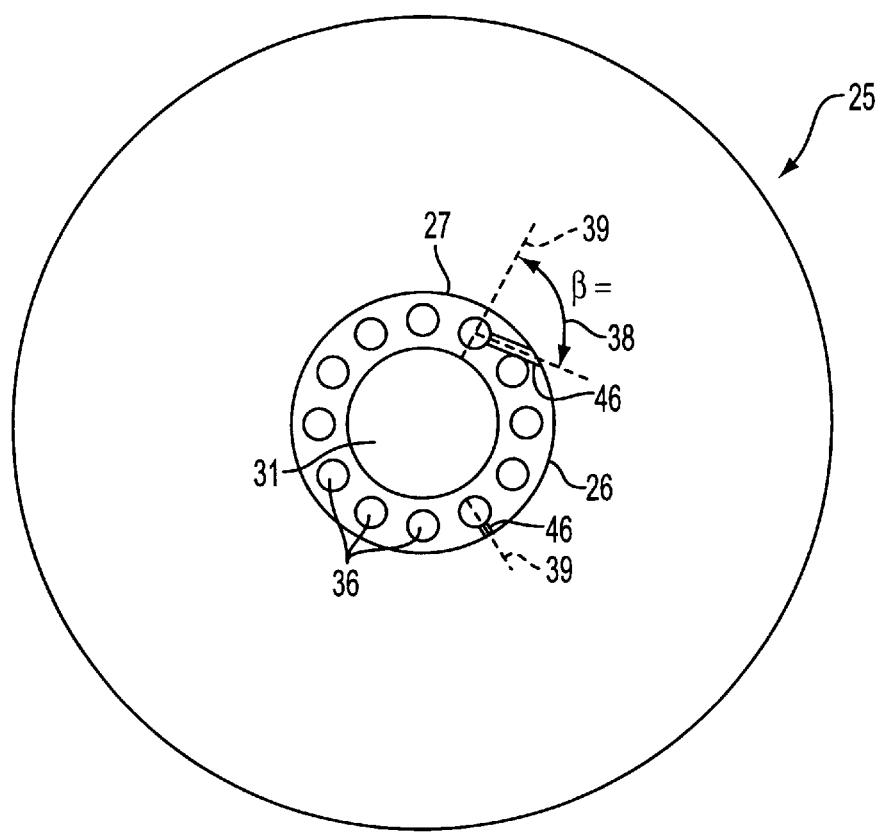
FIG. 4 shows a partial plan view onto a filter element in accordance with FIG. 3.

As shown in FIG. 4, the position of the inflow channel 46 may differ from the radial position as a result of the design of the stilling chamber 52 with a wall 50 opposite the opening 44 of the inflow channel 46. It may be desirable to dispose the inflow channel 46 at an angle 38 with respect to the radial line 39. In this case, the angle 38 may be up to approximately 80°.

The flow in the inlet line 36 has a high velocity in order to supply all inflow channels 46 of the entire filter packet 28 with material to be filtered in a vertically uniform fashion. In this case, the material to be filtered enters the inlet line 36 at a high flow velocity, thereby possibly creating an injector effect at the branches into the inflow channel 46, particularly in the case of the lower filter elements 25. This may mean that material to be filtered is conveyed back via the inflow channel 46 from the space 29 for material to be filtered, whereby a uniform build-up of the filter cake 59 is obstructed. The entire filter pack, however, attains its full performance level only when a homogeneous filter cake has been built up uniformly on all filter elements. To avoid the injector effect, as shown in FIG. 2, a counterbore 43 is formed in the wall 42 of the inlet line 36. The inflow channel 46 branches from the counterbore 43. The design of the inflow channel 46, particularly, its bore diameter, can now be selected exclusively on the basis of the given pressure conditions and flow conditions, since an injector effect is largely avoided via the housing counterbore, which is designed to be larger, or a housing pocket 43 or the like disposed on the wall 42 of the inlet line 36. The inflow channel 46 branches off from the housing pocket 43 with a smaller diameter than the housing pocket 43. The inflow channel, preferably, may be designed as a diffusor (FIG. 6).

Figure 5:
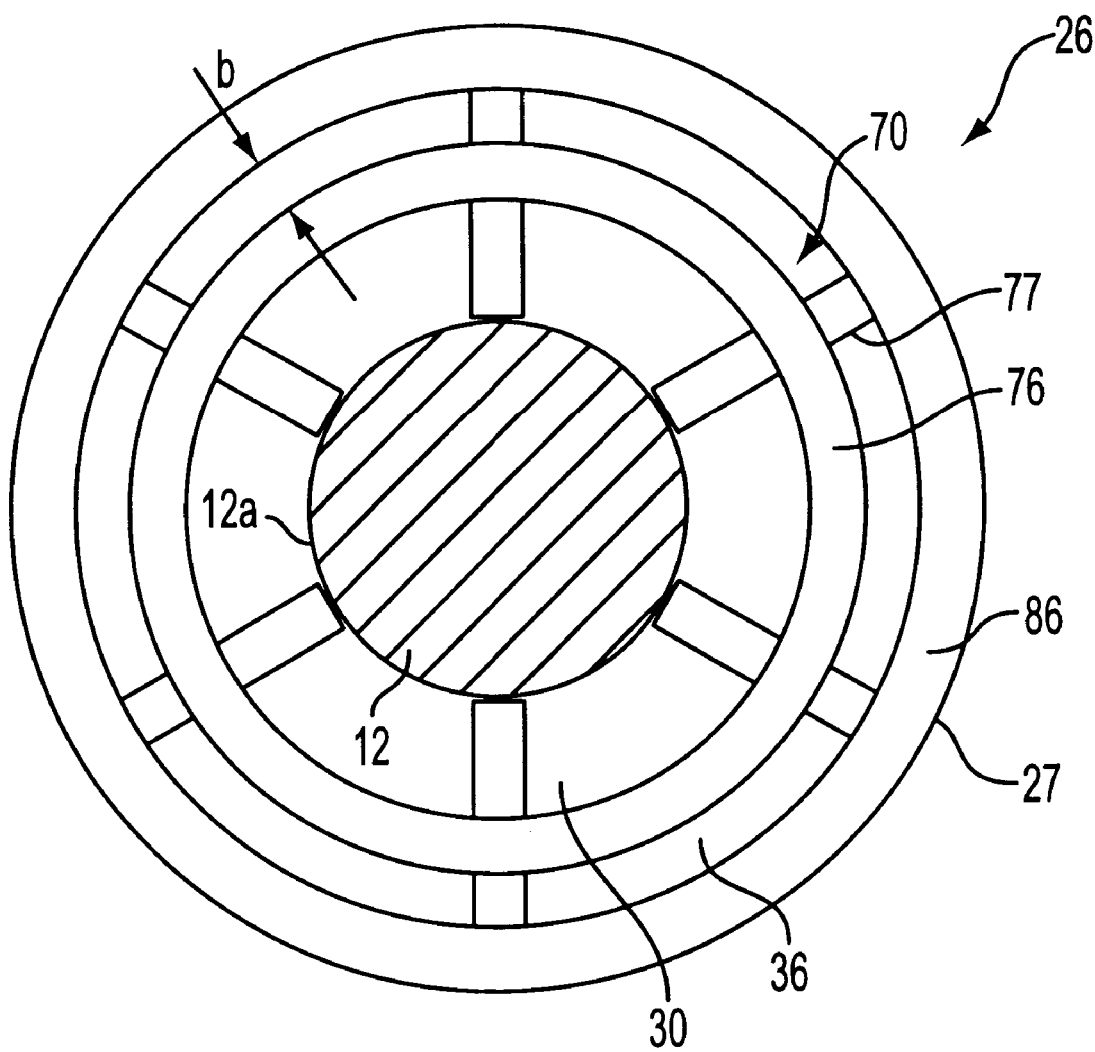
FIG. 5 shows, in diagrammatic representation, a cross-section through the hub of a filter element.
Figure 6:
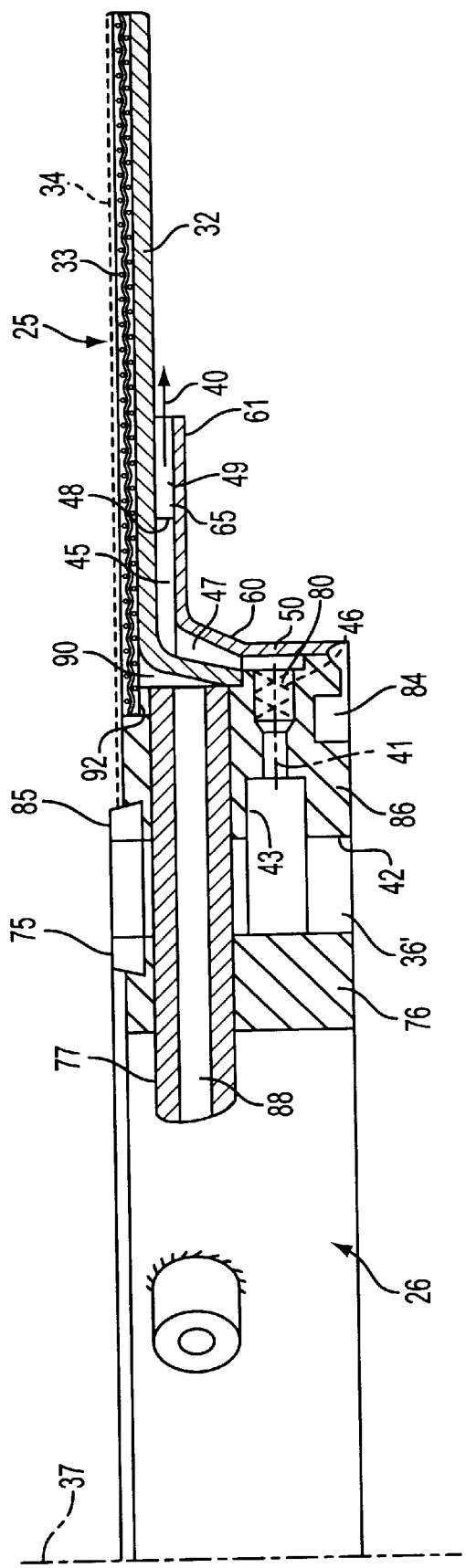
FIG. 6 shows a partial cross-section through a filter element having a hub in accordance with FIG. 5.

In the embodiment of FIGS. 5 and 6—as is diagrammatically represented in FIG. 5—the hub 26 is composed of an inner ring 76 and an outer ring 86, which are situated to be rigidly oriented relative to one another by means of at least three radial bolts 77. The radial bolts 77 penetrate the inner ring 76 and rest, for example, on the envelope 12a of the shaft 12. In this way, the hub 26 can be oriented in its position on the shaft 12 by means of the radial bolts 77. The inner ring 76 lies at a radial spacing b from the outer ring 86 so that an annular space 70 is formed between the rings 76 and 86. This annular space 70 forms the inlet line 36 for the material to be filtered. If the radial bolts 77 are designed as hollow tubes 88, as is shown in FIG. 6, then the filtrate can flow away from the outer periphery 27 of the hub 26 in liquid-tight fashion through the annular space 70 to the inner annular channel 30, which is formed between the shaft 12 and the inner periphery of the inner ring 76. Preferably, more than three radial bolts 77 or hollow tubes 88 (FIG. 6) are disposed. In this case, the hollow tubes are chamfered at their end facing the shaft 12 to guarantee a disturbance-free filtrate outlet into the annular channel 30. By arranging at least three radial bolts 77, spaced at approximately equal distances in the peripheral direction of the hub 26, it is possible to guarantee a reliable centering of the hub 26 on the shaft 12. More than three radial bolts 77 are preferably provided. In the illustrative embodiment, six radial bolts 77 are arranged.

As is evident from the cross-sectional representation according to FIG. 6, the radial bolt 77, or the hollow tube 88, has been inserted in liquid-tight fashion, expediently welded, into the inner ring 76 and the outer ring 86, respectively. The filter tray 32 is fixedly welded by an inner collar on a housing shoulder 80 of the outer ring 86 in such a manner that the annular filter tray 32 lies precisely at right angles to the central axis 37 of the hub 26. A drainage 33, which is designed in the form of a mat and lies, at its inner periphery, in a counterbore 92 of the one axial end face of the hub 26, is fitted to the filter tray 32. The drainage mat 33 is covered over by a filter gauze 34, which can consist of a plastic material or a fine steel. The filter gauze 34 projects beyond the filter mat toward the hub 26 and ends ahead of a sealing ring 85, which is retained at that inner edge of the outer ring 86 that faces the annular space 70. In corresponding fashion, a sealing ring 75 is let in at that outer peripheral edge of the inner ring 76 that faces the annular space 70. The sealing rings 75 and 85 are provided for sealingly connecting a filter element 25 to the annular space 70. On that axial end face of the hub 26 that is opposite to the sealing elements there is disposed, only at the outer margin of the outer ring 86, a ring seal 84 that rests in surface fashion on the inner margin of the drainage mat 33 of an adjacent filter element in sealing fashion and thus in sealing fashion closes the filtrate outlet space 90 formed between the inner collar of the filter tray 32 and the hub 26. A sleeve 60, which is fitted on and welded to the hub envelope 27 of the hub 26, on the one hand, forms the wall 50 against which flow takes place, and, on the other hand, bounds the annular distributor space 47 and forms, by its collar 61, the outlet paths 49 between the separating walls 48. The material to be filtered will flow out in the direction of the arrow of the outlet flow 40 radially and approximately parallel to the filter plate 32, whereby a uniform horizontal distribution of the material to be filtered and of the auxiliary filtration substances contained therein is guaranteed, even over a large diameter of the filter elements.

After a build-up of the filter cake 59, see FIG. 2, on the filter gauze 34, the filtrate present will flow through the filter gauze 34 into the drainage mat 33 and will, from there, flow radially inwards into the filtrate outlet space 90. The latter is connected, via the hollow tube 88, to the inner annular channel 30 between the shaft 12 and the hub 26, so that the filtrate can flow away without obstruction.

To avoid the injector effect at the inflow channel 46 branchings from the inlet line 36 for the material to be filtered, a housing counterbore 43 is provided in the wall 42 of the outer ring 86. The housing counterbore 43, in the embodiment shown, is designed as a peripheral groove. The inflow channel 46, preferably, is designed as a diffusor. A constriction 41, capable of actively throttling the flow, is formed in the inflow channel 46 between the inlet line 36 and the opening 44 of the inflow channel 46 into the chamber 52.

In a further refinement, an annular step 62 of height u is formed in the filter tray 32'. In this case, the step 62 lies at the height of the opening of the outlet path 49. As a result, a free space is formed in the region of the opening that guarantees an unobstructed flow cross-section to achieve a very uniform horizontal distribution.

What is claimed is:

1. A filter for the filtration of suspensions, comprising:
   a container having a longitudinal axis;
   a shaft extending along said longitudinal axis within the container;
   a plurality of filter elements stacked one on the other to form a filter pack in said container, each said filter element having a hub coaxially surrounding the shaft, each said hub having a radial outer periphery, each filter element including an annular filter tray having an inner periphery sealingly attached to the radial outer periphery of each said hub, filter media disposed on an upper surface of each said filter tray, each said filter member including an imperforate annular member having a radially inner periphery sealingly attached to the radial outer periphery of the respective hub adjacently below the respective filter tray, each said annular member having a radially outer portion that extends parallel to a lower surface of the respective filter tray, wherein a radially inner portion of each said annular member defines an annular distributor space with the radial outer periphery of the respective hub and with the lower surface of the respective filter tray, and wherein the radial outer portion of each said annular member includes an imperforate annular collar that defines a plurality of separate radial channels with the lower surface of the respective filter tray, wherein said radial channels extend continuously from the annular distributor space to a radial outer periphery of the respective annular member;
   a plurality of inlet bores extending axially through said hub for a material to be filtered passing axially through the hub; and
   a plurality of adjacent inflow channels disposed within each said hub, each said inflow channel extending radially outwardly from a respective said inlet bore to the annular distributor chamber and being distributed substantially uniformly in a peripheral direction of the respective hub wherein the annular collar includes a plurality of dividing walls for defining said plurality of radial channels, wherein each said radial channel is configured and arranged to form a concentrated radial liquid jet that is directed radially with respect to said longitudinal axis and substantially parallel to the lower surface of the respective filter tray and the filter media of the adjacent lower filter element, by which the material to be filtered is brought into a space between the lower surface of the respective filter tray and the filter media of the adjacent lower filter element.

2. A filter according to claim 1, wherein the dividing walls are circumferentially located between radially outer openings of said adjacent inflow channels.

3. A filter according to claim 2, wherein the imperforate annular member includes a wall opposite the radially outer openings of the inflow channels that forms a wall portion of the annular distribution chamber.

4. A filter according to claim 3, wherein the wall is situated at an angle of approximately 10° to 170° to a central axis of the inflow channel.

5. A filter according to claim 3, wherein the wall extends over the entire cross-section of the radially outer opening of the inflow channel and is radially spaced from the radially outer opening.

6. A filter according to claim 3, wherein the radial outer periphery of the hub includes a circumferential channel forming a stilling chamber associated with each radially outer opening of the inflow channels of the respective hub.

7. A filter according to claim 6, wherein each said inflow channel includes a constriction formed between the respective radially outer opening and the respective said inlet bore.

8. A filter according to claim 6, wherein the stilling chamber lines completely in the hub.

9. A filter according to claim 1, wherein a cross-section of each said radial channel is greater than a cross-section of a radially outer opening of each said inflow channel to the annular distribution chamber.

10. A filter according to claim 1, wherein a radially inner portion of each said inflow channel that adjoins the respective inlet bore is counter bored.

11. The filter according to claim 1, wherein a major axis of the inflow channel extends at an angle of 0 up to 80 degrees to a radial line extending radially from a center of the filter elements.

12. A filter according to claim 1, wherein each filter element includes the filter tray having, at radially outer openings of the radial channels, an upward extending step formed therein.

13. A filter according to claim 12, wherein the step is shaped as a circulating annular step.

14. A filter for the filtration of suspensions, comprising:
a container having a longitudinal axis;
a shaft extending along said longitudinal axis within the container;
a plurality of filter elements stacked one on the other to form a filter pack in a container, each said filter element having a hub coaxially surrounding the shaft, each said hub having a radial outer periphery, each filter element including an annular filter tray having an inner periphery sealingly attached to the radial outer periphery of each said hub, filter media disposed on an upper surface of each said filter tray, each said filter member including an imperforate annular member having a radially inner periphery sealingly attached to the radial outer periphery of the respective hub adjacently below the respective filter tray, each said annular member having a radially outer portion that extends parallel to a lower surface of the respective filter tray, wherein a radially inner portion of each said annular member defines an annular distributor space with the radial outer periphery of the respective hub and with the lower surface of the respective filter tray, and wherein the radial outer portion of each said annular member includes an imperforate annular collar that defines a plurality of separate radial channels with the lower surface of the respective filter tray, wherein said radial channels extend continuously from the annular distributor space to a radial outer periphery of the respective annular member;
an inlet line for a material to be filtered passing axially through the hub; and
a plurality of adjacent inflow channels disposed within each said hub, each said inflow channel extending radially outwardly from the inlet line to the annular distributor chamber and being distributed substantially uniformly in a peripheral direction of the respective hub wherein the annular collar includes a plurality of dividing walls for defining said plurality of radial channels, wherein each said radial channel is configured and arranged to form a concentrated radial liquid jet that is directed radially with respect to said longitudinal axis and substantially parallel to the lower surface of the respective filter tray and the filter media of the adjacent lower filter element, by which the material to be filtered is brought into a space between the lower surface of the respective filter tray and the filter media of the adjacent lower filter element; and wherein each of the hubs includes an inner ring and an outer ring situated at a radial spacing concentrically with one another, the outer ring defining said radial outer periphery of the hub, and an annular space between the inner ring and the outer ring forms the inlet line.

15. A filter according to claim 14, wherein the inner ring and the outer ring are rigidly connected together by a plurality of bolts.

16. A filter according to claim 15, wherein the plurality of bolts include at least three bolts penetrating the inner ring and orienting the hub coaxially with the shaft.

17. A filter according to claim 16, wherein the bolts comprise a plurality of hollow tubes which form a plurality of filtrate outlet channels.

* * * * *